(12) United States Patent
Obasanjo et al.

(10) Patent No.: US 9,098,476 B2
(45) Date of Patent: Aug. 4, 2015

(54) METHOD AND SYSTEM FOR MAPPING BETWEEN STRUCTURED SUBJECTS AND OBSERVERS

(75) Inventors: Dare Obasanjo, Seattle, WA (US); Erik Meijer, Mercer Island, WA (US); Derek E. Denny-Brown, Seattle, WA (US); Mark W. Fussell, Sammamish, WA (US); Srikanth Mandadi, Redmond, WA (US); Ilia G. Ioffe, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 680 days.

(21) Appl. No.: 10/879,995

(22) Filed: Jun. 29, 2004

(65) Prior Publication Data
US 2005/0289457 A1    Dec. 29, 2005

(51) Int. Cl.
*G06F 17/00* (2006.01)
*G06F 17/22* (2006.01)
*G06F 17/30* (2006.01)

(52) U.S. Cl.
CPC ........ *G06F 17/2247* (2013.01); *G06F 17/2241* (2013.01); *G06F 17/30917* (2013.01)

(58) Field of Classification Search
CPC .......... G06F 17/30011; G06F 17/2247; G06F 17/2241; G06F 17/30917
USPC ...................... 715/501.1, 513, 760, 212–214, 715/227–228, 200, 230, 234–235, 255
See application file for complete search history.

(56) References Cited

U.S. PATENT DOCUMENTS

| | | | |
|---|---|---|---|
| 6,189,019 B1 * | 2/2001 | Blumer et al. | 715/513 |
| 6,366,934 B1 * | 4/2002 | Cheng et al. | 715/210 |
| 6,760,721 B1 * | 7/2004 | Chasen et al. | 1/1 |
| 6,889,226 B2 * | 5/2005 | O'Neil et al. | 1/1 |
| 7,224,919 B1 * | 5/2007 | Shemirani et al. | 399/72 |
| 7,237,193 B1 * | 6/2007 | Zaky et al. | 715/207 |
| 7,281,018 B1 * | 10/2007 | Begun et al. | 1/1 |
| 7,287,216 B1 * | 10/2007 | Lee et al. | 715/234 |
| 7,340,711 B2 * | 3/2008 | Hetzel et al. | 716/130 |
| 7,426,734 B2 * | 9/2008 | Debique et al. | 719/310 |
| 7,430,711 B2 * | 9/2008 | Rivers-Moore et al. | 715/221 |
| 7,496,837 B1 * | 2/2009 | Larcheveque et al. | 715/237 |
| 7,836,098 B2 * | 11/2010 | Baby et al. | 707/803 |

(Continued)

OTHER PUBLICATIONS

'Tables in HTML Documents', http://www.w3.org/TR/html4/struct/tables.html, Aug. 15, 2000, W3C.*

(Continued)

*Primary Examiner* — Thu Huynh
(74) *Attorney, Agent, or Firm* — Brian Haslam; Mike Allen; Micky Minhas

(57) ABSTRACT

A method of binding elements of a structured document to an observer structure includes obtaining the logical structure of a document. Nodes representing information contained in the document are mapped to an observer structure which can include both a user interface or a programming object. The user interface may be a graphical user interface including a display form of a grid-like structure to contain the structured document information. The data binding which maps the structured document information to the observer form may be directionally controllable such that any change made to the information at the observer may be reflected in the source structured document.

19 Claims, 4 Drawing Sheets

(56) References Cited

U.S. PATENT DOCUMENTS

| | | | |
|---|---|---|---|
| 7,877,366 B2* | 1/2011 | Wang et al. | 707/702 |
| 7,941,456 B2* | 5/2011 | Tokui et al. | 707/802 |
| 2002/0023113 A1* | 2/2002 | Hsing et al. | 707/513 |
| 2002/0111964 A1* | 8/2002 | Chen et al. | 707/513 |
| 2002/0116371 A1* | 8/2002 | Dodds et al. | 707/3 |
| 2002/0120598 A1* | 8/2002 | Shadmon et al. | 707/1 |
| 2003/0018666 A1* | 1/2003 | Chen et al. | 707/513 |
| 2003/0101194 A1* | 5/2003 | Rys et al. | 707/101 |
| 2003/0163603 A1* | 8/2003 | Fry et al. | 709/328 |
| 2003/0167445 A1* | 9/2003 | Su et al. | 715/513 |
| 2003/0212664 A1* | 11/2003 | Breining et al. | 707/3 |
| 2004/0003341 A1* | 1/2004 | alSafadi et al. | 715/500 |
| 2004/0019589 A1* | 1/2004 | Basrur | 707/3 |
| 2004/0044961 A1* | 3/2004 | Pesenson | 715/513 |
| 2004/0163041 A1* | 8/2004 | Engel | 715/509 |
| 2004/0172616 A1* | 9/2004 | Rothschiller et al. | 717/114 |
| 2004/0193607 A1* | 9/2004 | Kudo et al. | 707/9 |
| 2004/0193661 A1* | 9/2004 | Sikchi et al. | 707/205 |
| 2004/0205554 A1* | 10/2004 | Goswami et al. | 715/513 |
| 2004/0220912 A1* | 11/2004 | Manikutty et al. | 707/3 |
| 2004/0230569 A1* | 11/2004 | Rys et al. | 707/3 |
| 2005/0021548 A1* | 1/2005 | Bohannon et al. | 707/101 |
| 2005/0022115 A1* | 1/2005 | Baumgartner et al. | 715/513 |
| 2005/0038796 A1* | 2/2005 | Carlson et al. | 707/100 |
| 2005/0055343 A1* | 3/2005 | Krishnamurthy | 707/3 |
| 2005/0060306 A1* | 3/2005 | Hattori et al. | 707/3 |
| 2005/0114763 A1* | 5/2005 | Nonomura et al. | 715/513 |
| 2005/0154979 A1* | 7/2005 | Chidlovskii et al. | 715/513 |
| 2005/0187973 A1* | 8/2005 | Brychell et al. | 707/104.1 |
| 2006/0005122 A1* | 1/2006 | Lemoine | 715/513 |
| 2007/0016605 A1* | 1/2007 | Murthy et al. | 707/102 |
| 2008/0147723 A1* | 6/2008 | Meliksetian et al. | 707/103 R |
| 2008/0172408 A1* | 7/2008 | Meliksetian et al. | 707/102 |
| 2009/0119578 A1* | 5/2009 | Relyea et al. | 715/234 |
| 2009/0138790 A1* | 5/2009 | Larcheveque et al. | 715/224 |
| 2009/0177960 A1* | 7/2009 | Lemoine | 715/237 |

OTHER PUBLICATIONS

'Empty cells in HTML tables', http://www.cs.tut.fi/~jkorpela/HTML/emptycells.html, Oct. 2003.*

XMLspy 5 User and Reference Manual, Altova, 2003, pp. I-XVIII, and 479-509.*

Comai, S. et al., "Computing Graphical Queries over XML Data", *ACM Transactions on Information Systems*, Oct. 2001, 19(4), 371-430.

Jagadish, H.V. et al., "TIMBER: A Native XML Database", *The VLDB Journal-The International on Very Large Data Bases*, Dec. 2002, 11(4), 274-291.

* cited by examiner

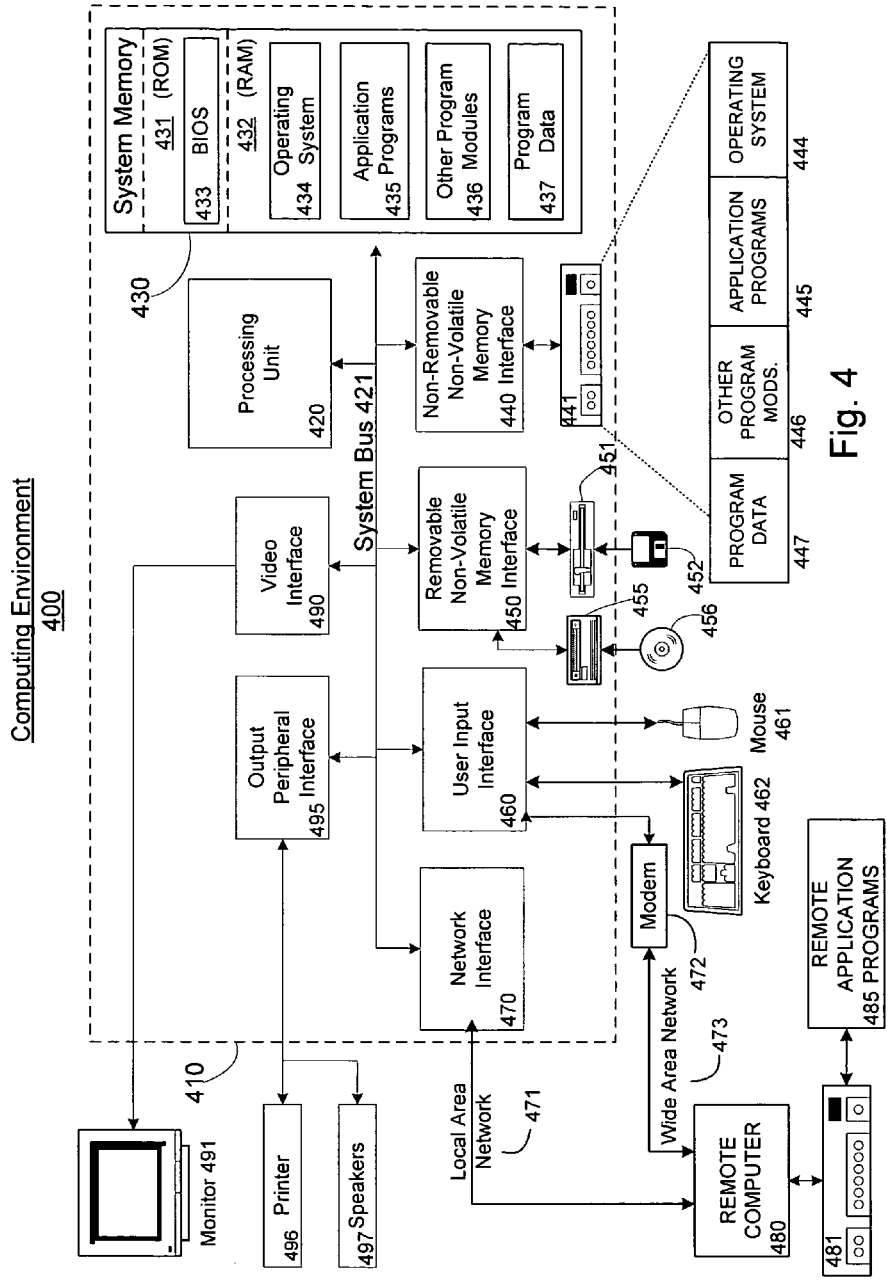

METHOD AND SYSTEM FOR MAPPING BETWEEN STRUCTURED SUBJECTS AND OBSERVERS

FIELD OF THE INVENTION

This invention relates in general to the field of data translation. More particularly, this invention relates to the mapping of a structured document to an observer form.

BACKGROUND OF THE INVENTION

The Extensible Markup Language (XML) was originally envisioned as a language for defining new document formats for the World Wide Web. XML can be considered to be a meta-language; a language for defining markup languages. XML is a text-based format that provide mechanisms for describing document structures using markup tags such as words surrounded by '<' and '>' symbols.

As XML's usage has grown, it has become generally accepted that XML is not only useful for describing new document formats for the Web but is also suitable for describing structured data. Examples of structured data include information which is typically contained in spreadsheets, program configuration files, and network protocols. XML is preferable to previous data formats because XML can easily represent both tabular data, such as relational data from a database or spreadsheet, and semi-structured data, such as a web page or business document.

With this proliferation of XML data, there is a significant need for tools for visualizing XML documents as well as a common framework upon which these tools can be built. To date, a great many tools for visualizing XML mainly focus on displaying the raw XML text in a well formatted manner and with certain syntax coloring to distinguish various lexical constructs. However, there is no system which describes a system for visualizing XML documents based on their logical structure as opposed to physical structure and which provides a mechanism for visualizing these logical structures.

Thus, there is a need for a method or system to allow a view of the logical structure of a structured document to an observer form such as a graphical user interface or a programming language object. The present invention addresses the aforementioned needs and solves them with additional advantages as expressed herein.

SUMMARY OF THE INVENTION

The subject invention relates to a system for binding the nodes of a structured document, based on their logical structure as opposed to physical structure, to observer structures and forms. The observer structures and forms may include traditional graphical user interface components such as grids and trees or programming objects. Aspects of the invention also include providing direction control over the data binding such that a change in the observer form can result in a change to the structured document. One way or two way binding is possible.

As an aspect of the invention, the structured document may be an XML document and the schema used may be an XML schema. The logical structure discerned by an aspect of the invention may be viewed using a XPath document view.

BRIEF DESCRIPTION OF THE DRAWINGS

The foregoing summary, as well as the following detailed description of preferred embodiments, is better understood when read in conjunction with the appended drawings. For the purpose of illustrating embodiments of the invention, there is shown in the drawings exemplary constructions of the invention; however, the invention is not limited to the specific methods and instrumentalities disclosed. Like reference numerals of the exemplary constructions represent similar parts throughout all of the drawings wherein;

FIG. 4 is a block diagram showing an exemplary computing environment in which aspects of the invention may be implemented.

DETAILED DESCRIPTION OF ILLUSTRATIVE EMBODIMENTS

Overview

Programmers are increasingly dealing with a wide range of data models that go beyond traditional relational/tabular or object-oriented forms. At the same time, the so-called rich client is gaining in popularity. Aspects of the invention enable the manipulation of any addressable data source, such as a collection of addressable elements, by rich graphical user interfaces. One approach to the task of allowing a view of the logical structure of a structured document to an observer form is to uncover the logical form, visualize the logical form and then transform the logical view into the desired observer form. One aspect of the invention discloses a method of discerning the logical structure within a structured document and making it available for a viewer. The logical structure, once discerned, may be transformed into an observer form that is beneficial to the user. The observer form may be either a graphical user interface, such as a grid, or it a may be a programmer object useful for some further purpose. One technique to transform the logical structure of a structured document into a suitable observer form is to use an extension of XPath to query and edit the structured data if the structured data is XML. The principles of these approaches is provided along with the exemplary embodiments presented below.

Descriptions and Examples of the Invention

Figure 1:
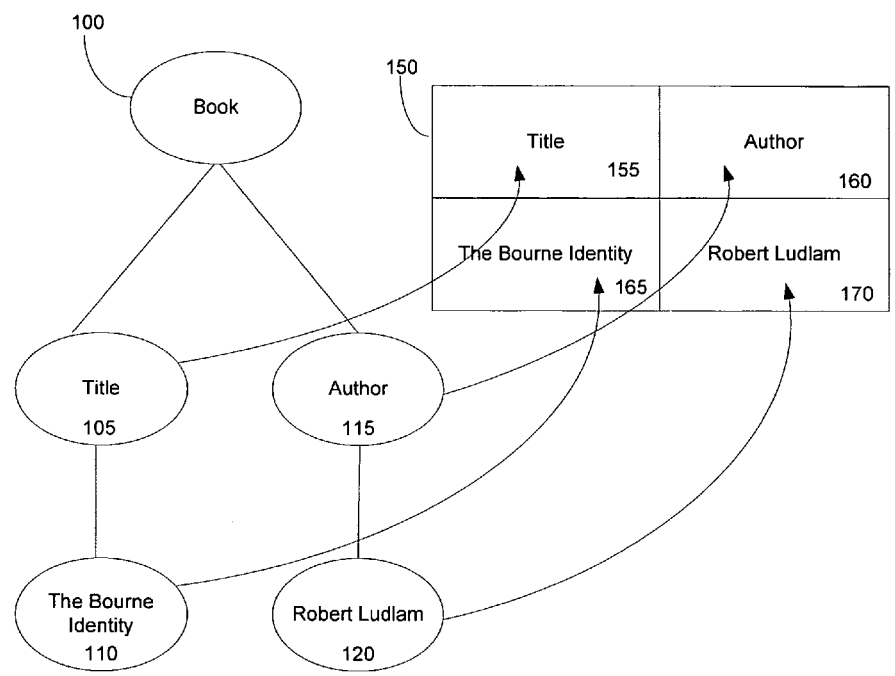
FIG. 1 is a block diagram showing a translation aspect of the invention.

One example use of the invention is to map a logically organized structured document tree into a grid-like structure such as a table. FIG. 1 depicts a logical tree structure 100 describing a book having a title node 105 and an author node 115. Each of these first level nodes has child nodes of title data 110 and author data 120 respectively. One aspect of the invention is the ability to bind nodes of the logical tree structure with a grid-like construction 150 such that a correspondence between nodes and grid cells may occur. In the example of FIG. 1, the data in each node 105, 110, 115 and 120 are mapped into the grid cells 155, 165, 160 and 170 respectively. In one embodiment of the invention the binding may be a two way binding such that a user viewing the grid-like structure 150 may edit the structure 150 and have the edit reflected back into the source tree 100. In another embodiment, not shown in FIG. 1, the binding can result in a graphical user interface display of a logical or hierarchical tree structure.

In one embodiment of the invention, a structured document, such as an XML document, may be used as the raw source of a tree structure. The tree structure is obtained via the use of a an XML schema and an XPath document is used to assist in the extraction of a logical tree structure since it has XML schema information attached and therefore is schema aware. By utilizing the XML schema of the XPathDocument, a set of XML to user interface mapping rules can be established that enable XML to be displayed in a variety of controls, most notably, the data grid. This approach creates a mapping for the user interface control that is user-friendly in terms of having to write less code at the expense of not being able to define the row structure with restricted XPath expressions. That is, for example, there is no need to control how a row is mapped to the data grid because these rules are implied. This overall approach enables users to load XML into an XPath document in-memory XML store and then create an XPath document view class for this XPath document in order to bind to a user interface.

When binding XML to graphical user interface components it is preferable to ensure that, despite the flexible nature of XML, the data binding process is consistent. For example, consider an XML document that represents information about books that is bound to a grid. If the book element has required attributes, such as title and isbn number, with optional attributes, such as publication-date, it is important that when the XML document is bound to a grid that the optional fields are taken into consideration. In this example having optional attributes, book elements that have no publication-date, the result can be a column in the grid-like format that represents the attribute with a blank or null value.

Given that W3C XML Schema is the industry standard mechanism used to describe the structure of an XML document, the XML data binding process utilizes an XML document's schema to determine how to map it to graphical user interface components such as grids and trees. The data binding process involves mapping the logical structures within an XML document described by an XML schema to an intermediate representation of named lists of nodes which can then be mapped to hierarchical graphical user interface components such as trees and grid-like graphical user interface components such as tables.

In an embodiment of a mapping of an XML schema to a user interface, a data-bound list, a data-bound node and a data-bound node property are used. A data-bound list is a collection of XML nodes that have been data bound to some control and is represented by an XPath document view object. If bound to a data grid, this corresponds to a table in the data grid. A data-bound node is an XML node that has been data bound to some control and is represented by an XPath node view object. If bound to a data grid, this corresponds to a row in the data grid. A data-bound node property is a property of an XML node that has been data bound to some control and is represented by a property descriptor of the XPath node view. A data-bound node property can either be a single item or a list of items. If bound to a data grid, this corresponds to either a column value of a row, if a single item, or a nested table related to a row in the data grid, if a list of items.

The mapping of elements and attributes to data bound lists and items include the building of data-bound lists and nodes. Building data-bound lists is an occurrence of one or more elements that are complex types. The list contains a number of data bound nodes that represent each instance of the complex type that appears in the actual document. For instance, the following complex type declaration maps to a list that contains a single data bound "books" node which in turn has a node property which is a list of several data bound "book" nodes:

```
<xs:element name="books">
    <xs:complexType>
        <xs:sequence>
            <xs:element name="book" type="bk:bookType"
                maxOccurs="unbounded" />
        </xs:sequence>
    </xs:complexType>
</xs:element>
```

Specifically, the above schema fragment generates an XPath document view that returns "books" when the method GetListName( ) is invoked on it and contains a single XPath node view which has a single property descriptor that represents an XPath document view that returns "book" when GetListName( ) is invoked on it. A particle containing repeating elements is treated as a data bound list. A particle may be a schema component that corresponds to an xs:element, xs:group, xs:all, xs:sequence, xs:choice or xs:any. More broadly, a particle may apply to any unit of composition as identified by the particular schema mechanism that is used to describe the structure of the subject. For databound lists obtained from repeating instances of xs:group the value returned by GetListName( ) for the generated XPath document view is the name of the group declaration. For other particles the name returned by GetListName( ) is an autogenerated name. Any particle (except for xs:element) that is nested within another particle is treated as a databound list. The name returned by GetListName( ) for the XPath document view that this corresponds to is autogenerated.

Building data-bound nodes is an occurrence of a complex typed element. The attributes of the element become data bound node properties; each containing a single item representing the attribute. The child elements of the complex typed element also become properties of the data bound node. Child elements that have a simple type and do not repeat are properties that contain a single item while child elements that repeat or that have a complex type become properties that contain a list of items. For elements that are complex types with content such as text, the text content is treated as a data bound node property whose name is the name of the element with "_Text" appended to it. For instance, when bound to a data grid, the element <pubDate edition="2nd">2001</pubDate> maps to the following row:

| Edition | Pubdate_Text |
|---------|--------------|
| 2nd     | 2001         |

For elements with mixed content, such as elements which are interspersed with text, the XML content of the element is mapped to a data bound node property whose name is the name of the element with "_Text" appended to it while the child elements of the node are ignored for data binding purposes. For instance, when bound to a data grid, the element <p>I am <b>mixed</b> content</p> maps to the following row:

| P_Text |
|--------|
| I am <b> mixed </b> content |

Elements that have simple types can be data bound properties of a data bound node. For an XML document consisting of a single element which has a simple type, that element becomes a data bound node with the value of the element becoming a data bound node property whose name is the name of the element with "_Text" appended to it. Attributes are usually data bound properties of a data bound node unless they are bound to directly. If an element has an attribute and a child element of simple type with the same name then the attribute may be prepended with an "@" sign when its name is exposed as a data bound node property. In situations when attributes in an XML document are bound to directly, such as when an XPath document view is created with a restricted XPath expression, such as "/books/book/@isbn", then that attribute becomes a data bound node with the value of the attribute becoming a data bound node property whose name is the name of the attribute with "_Text" appended to it.

In one embodiment, comments, processing instructions and namespace nodes may be ignored during the data binding process. Example of ignored items are attributes from the XML namespace, such as, for example, http://www.w3.org/XML/1998/namespace can be ignored and not be data bound. Also, attributes from the W3C XML Schema instance namespace, such as, for example, http://www.w3.org/2001/XMLSchema-instance may be ignored and are not data bound. Also the effects of an type attributes may be are ignored. For example, if the schema describes a book type and in the instance a periodical subtype derived by extension is substituted using type attributes and elements that were not declared in the base type, then these type attributes can be ignored and are not data bound. In another instance, nodes that match wildcards may be ignored and not data bound.

Once data in a structured document has been logically outlined, it may be expressed in a user interface according to aspects of the invention. One of the aspects of the invention is the expression of the structured document information into an observer form. Many graphical user interface (GUL) applications are based on the so-called model-view-controller or the closely related observer pattern. An objective of these design patterns is to keep a "model" or "subject" and one or more "views" or "observers" on that model/subject in sync. In the model-view-controller type pattern there is a category of component called the "controller" that coordinates the changes between model and view, in the observer pattern, a view and it's controller are combined into a single observer.

Data-binding is a prime example of this pattern where you bind a data source subject to a graphic user interface (GUI) observer, for instance a dataset bound to a graphical data grid. Changes in the dataset are propagated to the grid and vice-versa. For instance, in the following example, the "Text" property of the TextBox control "t" is bound to the property Name of a Person object "p":
TextBox t=new TextBox( );
Person p=new Person( );
Binding b=new Binding("Text",p,"Name");
t.DataBindings.Add(b);

In this example, the Binder objects b serves as the controller paired with the TextBoxview:t: [Joe]←b→p: Person{Name="Joe"}. When a change occurs in the TextBox observer, the controller b raises a Parse event, followed by a Format event, the subject is changed, followed by another Format event. The Person subject typically registers a handler for the Parse events. Conversely, the controller raises a Format event when the subject changes, typically the TextBox view registers an event-handler for this.

It is also possible to bind a control to a more structured subject such as a dataset or a hierarchical object graph. In that case, the binding to the subject is done via a simple navigation path that consists of "." separated property names which selects a particular sub-subject to be bound to the view. For example, assume that a Person has an Address property that itself contains a country property, we can bind to country using the path "Address.Country":
Binding b=new Binding("Text",p,"Address.Country");
t.DataBindings.Add(b);

The binder pushes changes in the view to the control. However, in order to allow the binder to observe changes in the subject, the subject should expose an event called xxx changed for each property xxx for which changes should be propagated from subject to view. The binder will subscribe to the changed event, when this is fired by the subject, the binder will subsequently raise a Format event.

It one aspect of the invention, a user is able to bind parts of an XML document to grid-like structures such as tables in a relational database or tables in a spreadsheet and hierarchical structures such as tree controls in a graphical user interface or objects in a programming language. Binding refers to a process of mapping certain characteristics of the XML nodes in a document such as their names and values to the core constructs of the target domain. As indicated in the example of FIG. 1, an example of binding is mapping an XML subject such as the following:
<book>
<title>The Bourne Identity<title>
<author>Robert Ludlum</author>
</book>
to a table observer Book such as:

| title | author |
|---|---|
| The Bourne Identity | Robert Ludlum |

This outcome is as shown in FIG. 1. Alternately, the output may be translated to a programming language object observer "Book" of type:

```
class Book {
    string title{ get; set; }
    string author{ get; set; }
}
```

In one embodiment, a mechanism is provided for two way binding. Just like in the normal model-view-controller pattern, two way binding means that when the XML document is mapped to the other structure there is a 'live' link between the XML document and the alternate structure so that updates to the XML document are reflected in the structure and vice versa. For example, when the author column of the Book table above is changed this would also change the underlying XML file. Similarly if the value of the title was changed in an instance of the Book class described above then the underlying XML document would be updated. This works both ways so that changes to the XML document subject would also be reflected in the table or object observers.

To initiate the binding process, the nodes to bind to are identified using a hierarchical addressing mechanism such as the XPath language. Examples of such addresses could be /book-bind to the <book> element, //title-bind to all the <title> elements. This is an example of binding to a collection of addressable elements. There is also the ability to bind nodes in nested manner; that is, it is possible to bind to subparts of the subject. For example one could create a binding such as /book /title. In this case although the <book> element is being bound to only its <title> sub-element is being exposed in the target structure. This would change the above examples to a table observer Book such as:

| title |
|---|
| The Bourne Identity | or to a programming language object observer Book of type:

| class Book { |
|---|
| string title{ get; set; } |
| } |

In one embodiment of the invention, when an XML subject is bound to an observer, it can be indicated whether this binding should be a one-time bind, one way or two way. If it is a one time bind then the XML is bound to the structure and after that neither changes to the values in the structure or changes to the underlying XML are reflected in the other.

As in the instance of a one way binding, a binder coordinates changes in subject and observer. Changes in the observer are pushed to the subject as before, and the binder uses the path to update the appropriate locations in the subject. For this instance, we assume that subjects can support updates at a certain location path. It is notable how the subject communicates changes to binder since it might not be possible or desirable for the subject to expose XYZChanged events for each location XYZ in the subject. Instead, the subject exposes a single Changed event and communicates the location path of the change to the binder as a parameter to the event handler. In other word, we decouple the Changed events from their particular location.

In one embodiment, if changes are synchronized, there may be conflicts if the changes do not conform to the schema of the observer. For example, adding a new element to the XML subject that does not have a counterpart in the table or programming language object could produce a conflict. These conflicts can be either ignored or result on an error being thrown depending on what configuration option was chosen when the binding was initiated. Similarly, changes in the observer may not conform to the schema of the structure of the XML subject. Again, these changes can induce an error or be ignored.

Figure 2:
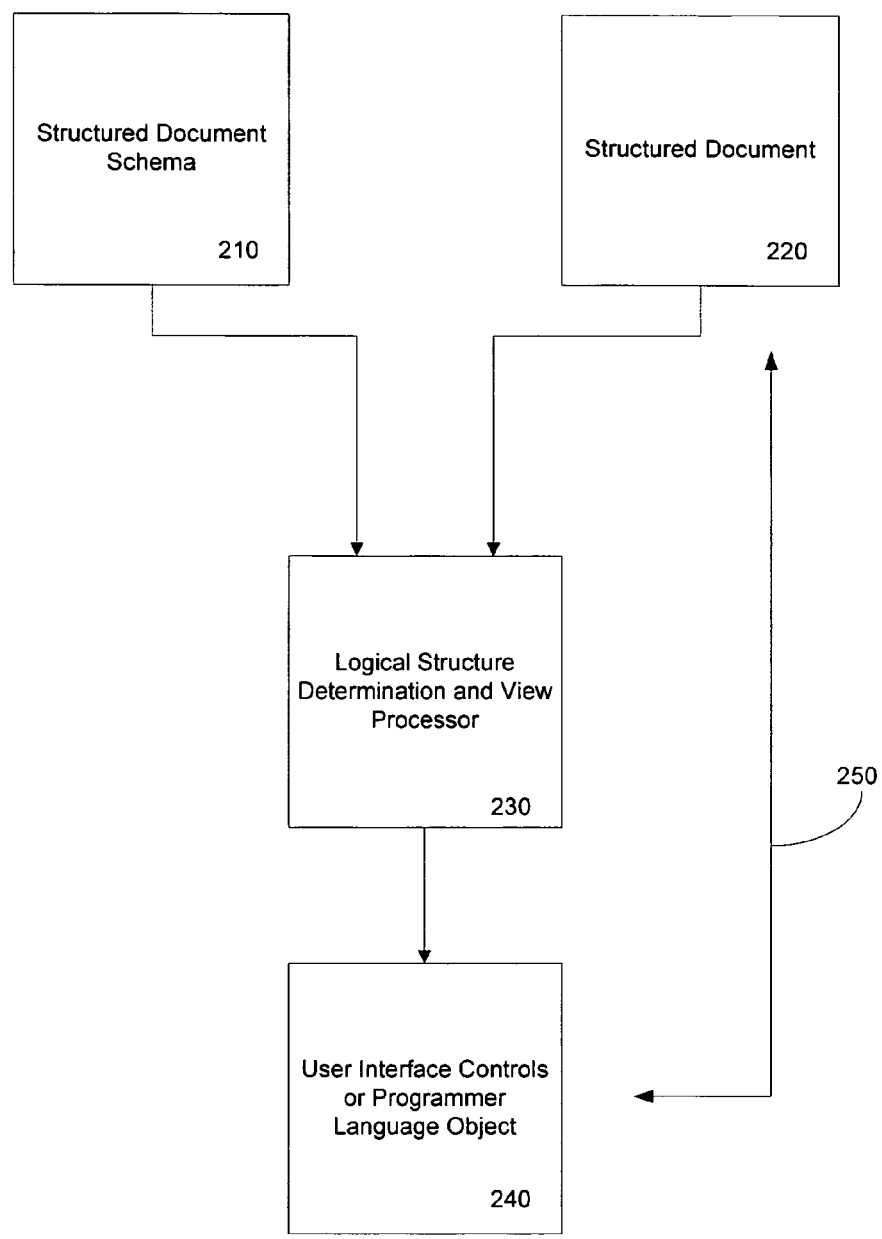
FIG. 2 is block diagram showing some elements of the invention.

FIG. 2 depicts a block diagram of aspects of the invention. In one embodiment of the invention, a schema 210 describing the form of a structured document is input into a processor 230. Another input into processor 230 is a structured document 220. Using the schema 210 and the structured document 220, the processor determines the logical construction of the structured document and produces a view of the structure. A user can manipulate user controls 240 to further display the logical organization of the structured document in a grid-like manner. Alternately, the user can use the user control 240 to generate a programmer language object from the logically organized data of the structured object. In another aspect of the invention, the mapping of data in the structured document to the user interface allows a one or two way binding 250 such that changes in the structured document 220 are reflected back to the user controls 240 and vice versa.

Figure 3:
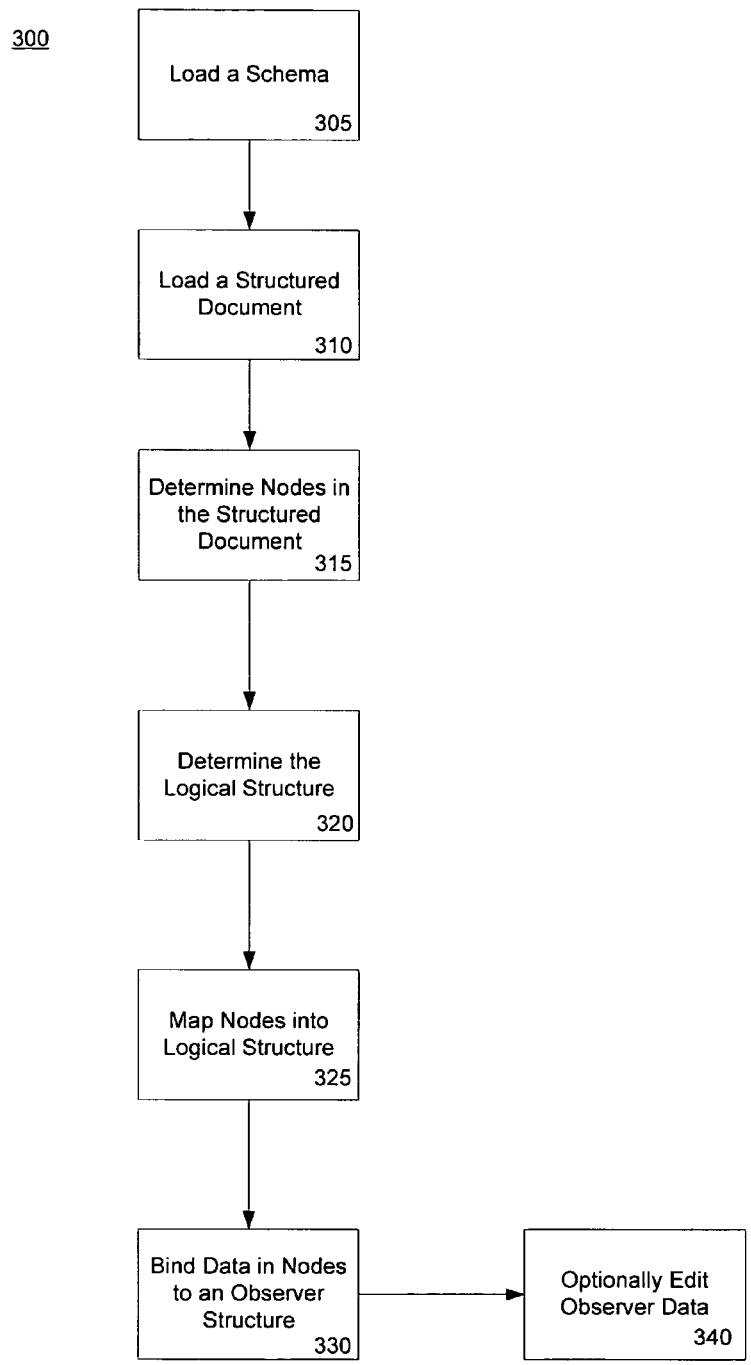
FIG. 3 is a exemplary flow diagram of an embodiment of the invention.

FIG. 3 is a flow diagram 300 showing aspects of the invention. The method 300 may begin by loading a schema (step 305). A structured document is also loaded (step 310). Nodes in the structured document may be discerned (step 315) according to the invention wherein the logical structure, as opposed to the physical structure, is detected (step 320). The detected nodes of the document are mapped into the logical structure (step 325) to allow the structured document data to populate the nodes. Data in the structured document is bound to an observer structure (step 330) such that a user may see the data in a form that is desired. For example, the desired form may be a grid-like organization present in a view of the structured document. If so, the grid data may be optionally edited at a user interface. If the data is edited, the binding occurring in step 330 can act to reflect the change in data back to the structured document. Alternately, the observer structure may take the form of a programming object where the user once again has the option of editing the object such that binding, if two way, can result in a change in the structured document. It can be appreciated by those of skill in the art the order of the steps 305-330 may be changed with out altering the result or changing the invention.

Exemplary Embodiments of Data-Binding Interfaces

Data binding may be achieved through a set of interfaces. In one embodiment, the interfaces are designated as the ICustomTypeDescriptor interface and the IBindingList interface.

The ICustomTypeDescriptor allows an object to provide type information about itself in a generic fashion. Data-binding takes advantage of this by getting information from the ICustomTypeDescriptors interface. Therefore, any object that implements this interface can be data-bound to for read-only scenarios. The ICustomTypeDescriptor interface exposes a set of PropertyDescriptors which give information about the object upon which it is to be implemented. These PropertyDescriptors are name/value pairs describing some aspect of the object and its value. For example, for a given object, a PropertyDescriptor may be generated for each Property the object contains. An example follows:

```
class Person : ICustomTypeDescriptor
{
property string Name = "Mark";
property string Address = "1 A Street";
property int Age = 26;
}
```

For the above class, three property descriptors would be generated; a PropertyDescriptor with Name "Name" which returns "Mark" for GetValue( ), a PropertyDescriptor with Name "Address" which returns "1 A Street" for GetValue( ), and a PropertyDescriptor with Name "Age" that returns 26 for the GetValue( ) call.

In order to support data binding for XML, an implementation desirably would expose an object that has properties that represent an item of data to bind against. This may be achieved with a XPathNodeView class which implements the ICustomTypeDescriptor interface. This class enables properties of the item to be read and updated. Below is an example of an XML document that can be bound to a control.

<bookstore>
<book title="The Autobiography of Benjamin Franklin" genre="autobiography" publicationdate="1981" ISBN="1-861003-11-0"> </book>
<book title="The Confidence Man" genre="novel" publicationdate="1967" ISBN="0-201-63361-2"> </book>
<book title="The Gorgias" genre="philosophy" publicationdate="1991" ISBN="1-861001-57-6"> </book>
</bookstore>

Below is an example using XPathNodeView to interact with the above XML document.

```
XPathDocument doc = new XPathDocument("c:\\books.xml");
//infer schema(s) for document
```

-continued

```
Inference testInference = new Inference( );
doc.SchemaSet =
testInfer.InferSchema(doc.CreateNavigator( ).ReadSubtree( ));
//validate document to make it typed
doc.Validate(null);
//bind to document
XPathDocumentView xmlItemCollection =
new XPathDocumentView (doc);
XPathNodeView xmlDRView = xmlItemCollection.AddNew( );
// Each assignment operation results in a new node being created in the
tree.
xmlDRView["title"] = "ADO.NET and System.Xml V2";
xmlDRView["genre"] = "Technical";
xmlDRView["publicationdate"] = "8/4/2003";
xmlDRView["ISBN"] = "123456-0000";
dataGrid1.DataSource = xmlItemCollection;
```

In one embodiment, data binding to a list is desirable. Many user interface controls may expect a list of data for binding purposes. An example would be a list of data to be placed in a data grid. To bind to a list of data, some user interface controls may expect to be given an object implementing an IList interface. Some user interface forms expects a data source to either support IList, including arrays or IListSource. This allows the control to iterate through the members of the list and extract out ICustomTypeDescritpors to be used during data binding.

In one embodiment, to implement list data binding, the XPathDocumentView class can implement the IList interface. If it is desirable to bind to a list of nodes resulting from a restricted XPath expression then one of the constructors for the XPathDocumentView that accepts a restricted XPath expression as input can be used. The following example binds a list of book elements to a DataGrid.

```
//setup XmlFactory to create a validating XML reader
    XmlFactory f = new XmlFactory( );
    f.ReaderSettings.Schemas.Add("books.xsd");
    f.ReaderSettings.XsdValidate = true;
    //load from validating reader so document is typed
    XPathDocument doc =
    new XPathDocument(f.CreateReader("books.xml"));
    XPathDocumentView xmlItemCollection = XPathDocumentView(doc,
    "/books/book");
    dataGrid1.DataSource = xmlItemCollection;
```

In one aspect of the invention, it is desirable to establish a binding such that changes or edits made to a source structured document or an observer item are reflected in one or the other. For example, an edit made to the underlying XPathDocument may desirably be reflected in the user interface. In one scenario, if a developer creates an XPathEditor on a set of nodes that are currently being displayed and makes updates to the XPathDocument, the XPathDocument can notify the user interface of those changes. As an aspect of the invention, any XPathEditor that causes changes to the XPathDocument may have its changes updated in the user interface. This reflection of changed or edits may be called change notification.

Change notification may be provided through the IBindingList interface. IBindingList can support a number of data binding related features and may also support a data bound user interface querying for support of those features. In order to support change notification, the IBindingList implementation returns "true" from SupportsChangeNotification property and raises the ListChanged event when a change occurs. An example is provided below.

```
//setup XmlFactory to create a validating XML reader
    XmlFactory f = new XmlFactory( );
    f.ReaderSettings.Schemas.Add("books.xsd");
    f.ReaderSettings.XsdValidate = true;
    //load from validating reader so document is typed
    XPathDocument doc =
    new XPathDocument(f.CreateReader("books.xml"));
    XPathDocumentView xmlItemCollection =
    new XPathDocumentView (doc);
    dataGrid1.DataSource = xmlItemCollection;
    XPathEditor editor = doc.CreateEditor( );
    XPathNodeIterator iter = editor.Select("/book[@genre='novel']");
    foreach (XPathNavigator navitem in iter)
    {
    iter.MoveToAttribute("ISBN", "");
    //At this point the dataGrid1 displays the new value of ISBN for
all the book with genre='novel'
    editor.SetValue("0000000000-000");
    editor.MoveToParent( );
    }
```

In one embodiment, support for editing user interface components is provided to the underlying XPathDocument from interacting with the XPathDocumentView. Such editing may include editing the values of items in the list, For example, changing CustomerName from "Fred" to "Bill" may be accomplished. Row level transactions on the items in the list are also possible as is adding and removing items from the list.

In a compatible embodiment, the XPathDocument supports update scenarios through an underlying XPathEditor. This means that the implementation of ICustomTypeDescriptor, for example an XPathNodeView, may return PropertyDescriptors that support updating. Setting the value of a PropertyDescriptor can map to one of several calls to an underlying XPathEditor positioned over the XPatlDocument. Thus there are methods compatible with the functionality of XML tools that allow a user to edit data in a data binding environment compatible with the present invention.

Examples of XML Data-Binding Interfaces Using XPathDocument

The following examples demonstrate exemplary results of applying aspects of the present invention with an input sample schema and an input sample structured document written in XML. In this example, the output is a grid-like representation of the implied structure of the data. The example follows.

Sample Schema:

```
<xs:schema xmlns:xs="http://www.w3.org/2001/XMLSchema"
    targetNamespace="urn:xmlns:25hoursaday-com:my-bookshelf"
    xmlns:bk="urn:xmlns:25hoursaday-com:my-bookshelf"
    elementFormDefault="qualified">
        <xs:element name="books">
        <xs:complexType>
        <xs:sequence>
        <xs:element name="book" type="bk:bookType"
    maxOccurs="unbounded" />
        </xs:sequence>
        </xs:complexType>
        </xs:element>
        <xs:complexType name="bookType">
        <xs:sequence>
        <xs:element name="title" type="xs:string" />
        <xs:element name="author" type="xs:string" />
        <xs:element name="publication-date" type="xs:date" />
        </xs:sequence>
        <xs:attribute name="publisher" type="xs:string" />
        <xs:attribute name="on-loan" type="xs:string" />
        </xs:complexType>
    </xs:schema>
```

Sample Structured Document:

```
<books xmlns="urn:xmlns:25hoursaday-com:my-bookshelf">
    <book publisher="Addison Wesley">
        <title>Essential C++</title>
        <author>Stanley Lippman</author>
        <publication-date>2000-10-31</publication-date>
    </book>
    <book publisher="WROX">
        <title>XSLT Programmer's Reference</title>
        <author>Michael Kay</author>
        <publication-date>2001-04-30</publication-date>
    </book>
    <book publisher="Apress" on-loan="Kevin">
        <title>Programmer's Introduction to C#</title>
        <author>Eric Gunnerson</author>
        <publication-date>2001-06-30</publication-date>
    </book>
</books>
```

Exemplary Results if /books/book bound to a grid control:

| publisher | title | author | publication-date | on-loan |
|---|---|---|---|---|
| Addison Wesley | Essential C++ | Stanley Lippman | 2000-10-31 | (null) |
| WROX | XSLT Programmer's Reference | Michael Kay | 2001-04-30 | (null) |
| Apress | Programmer's Introduction to C# | Eric Gunnerson | 2001-06-30 | Kevin |

Exemplary Computing Device

FIG. 4 and the following discussion are intended to provide a brief general description of a suitable computing environment in which embodiments of the invention may be implemented. While a general purpose computer is described below, this is but one example, and embodiments of the invention may be implemented with other computing devices, such as a client having network/bus interoperability and interaction. Thus, embodiments of the invention may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that data may be stored or from which data may be retrieved is a desirable, or suitable, environment for operation.

Although not required, embodiments of the invention can also be implemented via an operating system, for use by a developer of services for a device or object, and/or included within application software. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that various embodiments of the invention may be practiced with other computer configurations. Other well known computing systems, environments, and/or configurations that may be suitable for use include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. Embodiments of the invention may also be practiced in distributed computing environments where tasks are performed by remote processing devices that are linked through a communications network/bus or other data transmission medium. In a distributed computing environment, program modules may be located in both local and remote computer storage media including memory storage devices and client nodes may in turn behave as server nodes.

FIG. 4 thus illustrates an example of a suitable computing system environment 400 in which the embodiments of the invention may be implemented, although as made clear above, the computing system environment 400 is only one example of a suitable computing environment and is not intended to suggest any limitation as to the scope of use or functionality of an embodiment of the invention. Neither should the computing environment 400 be interpreted as having any dependency or requirement relating to any one or combination of components illustrated in the exemplary operating environment 400.

With reference to FIG. 4, an exemplary system for implementing an embodiment of the invention includes a general purpose computing device in the form of a computer system 410. Components of computer system 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer system 410 typically includes a variety of computer readable media. Computer readable media can be any available media that can be accessed by computer system 410 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), compact disc-rewritable (CDRW), digital versatile disks (DVD) or other optical disk storage, magnetic cassettes, magnetic tape, magnetic disk storage or other magnetic storage devices, or any other medium which can be used to store the desired information and which can accessed by computer system 410. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer system 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436, and program data 437.

The computer system 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456, such as a CD ROM, CDRW, DVD, or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 4 provide storage of computer readable instructions, data structures, program modules and other data for the computer system 410. In FIG. 4, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that, at a minimum, they are different copies. A user may enter commands and information into the computer system 410 through input devices such as a keyboard 462 and pointing device 461, commonly referred to as a mouse, trackball or touch pad. Other input devices (not shown) may include a microphone, joystick, game pad, satellite dish, scanner, or the like. These and other input devices are often connected to the processing unit 420 through a user input interface 460 that is coupled to the system bus 421, but may be connected by other interface and bus structures, such as a parallel port, game port or a universal serial bus (USB). A monitor 491 or other type of display device is also connected to the system bus 421 via an interface, such as a video interface 490, which may in turn communicate with video memory (not shown). In addition to monitor 491, computer systems may also include other peripheral output devices such as speakers 497 and printer 496, which may be connected through an output peripheral interface 495.

The computer system 410 may operate in a networked or distributed environment using logical connections to one or more remote computers, such as a remote computer 480. The remote computer 480 may be a personal computer, a server, a router, a network PC, a peer device or other common network node, and typically includes many or all of the elements described above relative to the computer system 410, although only a memory storage device 481 has been illustrated in FIG. 4. The logical connections depicted in FIG. 4 include a local area network (LAN) 471 and a wide area network (WAN) 473, but may also include other networks/buses. Such networking environments are commonplace in homes, offices, enterprise-wide computer networks, intranets and the Internet.

When used in a LAN networking environment, the computer system 410 is connected to the LAN 471 through a network interface or adapter 470. When used in a WAN networking environment, the computer system 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer system 410, or portions thereof, may be stored in the remote memory storage device. By way of example, and not limitation, FIG. 4 illustrates remote application programs 485 as residing on memory device 481. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET™ platform, available from Microsoft Corporation, includes servers, building-block services, such as Web-based data storage, and downloadable device software. While exemplary embodiments herein are described in connection with software residing on a computing device, one or more portions of an embodiment of the invention may also be implemented via an operating system, application programming interface (API) or a "middle man" object between any of a coprocessor, a display device and a requesting object, such that operation may be performed by, supported in or accessed via all of .NET™'s languages and services, and in other distributed computing frameworks as well.

As mentioned above, while exemplary embodiments of the invention have been described in connection with various computing devices and network architectures, the underlying concepts may be applied to any computing device or system in which it is desirable to implement a method to map structured elements to an observable form. Thus, the methods and systems described in connection with embodiments of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by embodiments of the invention.

The various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of an embodiment of the present invention, e.g., through the use of a data processing API or the like, are preferably implemented in a high level procedural or object oriented programming language to communicate with a computer. However, the program(s) can be implemented in assembly or machine language, if desired. In any case, the language may be a compiled or interpreted language, and combined with hardware implementations.

While aspects of the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the claimed invention should not be limited to any single embodiment, but rather should be construed in breadth and scope in accordance with the appended claims.

What is claimed:

1. A method comprising:
    identifying a logical tree contained within a structured document;
    identifying nodes of the logical tree;
    mapping the identified nodes into a logical structure, the logical structure populated with data in each of the identified nodes; and
    generating an observer structure for observing the data, the observer structure comprising a grid of cells that has a one-to-one structural correspondence with the nodes of the logical structure, with data in each of the nodes of the logical structure mapped into corresponding cells in the grid of cells, the grid of cells accommodating a required attribute and an optional attribute of an element contained in the logical tree, the optional attribute indicated by a null value in the grid of cells when the optional attribute is not present, wherein the observer structure comprises a table, and mapping the data in each of the nodes of the logical structure into corresponding cells in the grid of cells comprises a building of:
        a data-bound list binding to a first control, the data-bound list comprising a collection of nodes and corresponding to the table of the observer structure, the table having a plurality of rows and a plurality of columns, each row and column intersecting at a cell;
        a data-bound node binding to a second control, the data-bound node corresponding to a row in the observer structure; and
        a data-bound node property binding to a third control, the data-bound node property corresponding to a column value in the row of the observer structure.

2. The method of claim 1, wherein mapping the identified nodes into the logical structure comprises mapping the nodes into a representation of named lists of nodes and creating a structured document view using the logical structure.

3. The method of claim 2, wherein the structured document is an XML document and the list of nodes is used in creating an XPath document view.

4. The method of claim 1, wherein the observer structure comprises at least one of a graphical user interface or a programming language object.

5. The method of claim 4, wherein the structured document is an XPath document view.

6. The method of claim 4, wherein the programming language object is a hierarchical tree.

7. The method of claim 1, the generating comprising binding data contained in the logical structure to the observer structure, the binding comprising:
    indicating whether the binding should be a one way binding or a two way binding;
    when indication is for a one-way binding, implementing the binding such that edits made to the structured document are not carried over to the observer structure but edits made to the observer structure are carried over to the structured document; and
    else when indication is for a two way binding, implementing the binding such that edits made to the structured document are carried over to the observer structure and edits made to the observer structure are carried over to the structured document.

8. The method of claim 1, wherein the one-to-one structural correspondence between the grid of cells and the nodes in the logical structure comprises a plurality of cells in a first row of the grid of cells containing data from a plurality of child nodes located at a first hierarchical level of the logical structure.

9. The method of claim 8, wherein a plurality of cells in a second row, which is located below the first row of the grid of cells, contains data from a plurality of child nodes located at a second hierarchical level of the logical structure, the second hierarchical level located below the first hierarchical level of the logical structure.

10. A system for providing an observer structure corresponding to a structured document, the system comprising:
    a processor having access to a memory, the memory comprising executable instructions that when executed by the processor cause the processor to effectuate operations comprising:
        identifying nodes of a logical tree within the structured document;
        mapping the identified nodes into a logical structure; and
        binding data contained in the logical structure to the observer structure for observing the data, wherein each row level of the observer structure contains a plurality of locations in which is stored data obtained from each of a plurality of nodes in each corresponding row level of the logical tree, the observer structure accommodating a required attribute and an optional attribute of an element contained in the logical tree, the optional attribute indicated by a null value in the observer structure when the optional attribute is not present, wherein the observer structure comprises a table, representation of nodes is bound to a user interface creating a data grid mapping for user interface controls, and the binding comprises a building of:
            a data-bound list binding to a first control, the data-bound list being a collection of nodes and corresponding to the table of the observer structure, the table having a plurality of rows and a plurality of columns, each row and column intersecting at a cell;

a data-bound node binding to a second control, the data-bound node corresponding to a row in the observer structure; and a data-bound node property binding to a third control, the data-bound node property corresponding to a column value in the row of the observer structure; and the binding further comprising:

indicating whether the binding should be a one way binding or a two way binding;

if indication is for a one-way binding, implementing the binding such that edits made to the structured document are not carried over to the observer structure but edits made to the observer structure are carried over to the structured document; and else if indication is for a two way binding, implementing the binding such that edits made to the structured document are carried over to the observer structure and edits made to the observer structure are carried over to the structured document.

11. The system of claim 10, wherein the structured document is an XML document and the identified nodes are displayed in an XPath document view.

12. The system of claim 10, wherein the observer structure comprises at least one of a graphical user interface or a programming language object.

13. The system of claim 12, wherein the graphical user interface is a grid-like user interface.

14. The system of claim 12, wherein the programming language object is a hierarchical tree.

15. A hardware memory having computer-executable instructions for performing a method, the method comprising:

identifying nodes of a logical tree within a structured document;

mapping the identified nodes into a logical structure; and binding data contained in the logical structure to the observer structure for observing the data, wherein each row level of the observer structure contains a plurality of locations in which is stored data obtained from each of a plurality of nodes in each corresponding row level of the logical tree, the observer structure accommodating a required attribute and an optional attribute of an element contained in the logical tree, the optional attribute indicated by a null value in the observer structure when the optional attribute is not present, wherein the observer structure comprises a table, representation of nodes is bound to a user interface creating a data grid mapping for user interface controls, and the binding comprises a building of:

a data-bound list binding to a first control, the data-bound list being a collection of nodes and corresponding to the table of the observer structure, the table having a plurality of rows and a plurality of columns, each row and column intersecting at a cell;

a data-bound node binding to a second control, the data-bound node corresponding to a row in the observer structure; and a data-bound node property binding to a third control, the data-bound node property corresponding to a column value in the row of the observer structure; and the binding further comprising:

indicating whether the binding should be a one way binding or a two way binding;

if indication is for a one-way binding, implementing the binding such that edits made to the structured document are not carried over to the observer structure but edits made to the observer structure are carried over to the structured document; and else if indication is for a two way binding, implementing the binding such that edits made to the structured document are carried over to the observer structure and edits made to the observer structure are carried over to the structured document.

16. The hardware memory of claim 15, wherein the step of identifying nodes of the logical tree within the structured document comprises using an XML schema.

17. The hardware memory of claim 15, wherein the step of mapping comprises mapping the nodes into a representation of named lists of nodes and creating an XPath document view.

18. The hardware memory of claim 15, wherein the observer structure comprises at least one of a graphical user interface or a programming language object.

19. The hardware memory of claim 18, wherein the graphical user interface is a grid-like user interface and the programming language object is a hierarchical tree.

* * * * *